United States Patent
Oluwafemi et al.

(10) Patent No.: US 11,094,193 B2
(45) Date of Patent: Aug. 17, 2021

(54) REAL-TIME VEHICLE-BASED DATA GATHERING

(71) Applicant: Intel Corporation, Santa Clara, CA (US)

(72) Inventors: Olufemi Oluwafemi, Portland, OR (US); Andrew Wrenn, Chandler, AZ (US); Peggy Jo Irelan, Chandler, AZ (US); John Charles Weast, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/022,204

(22) Filed: Jun. 28, 2018

(65) Prior Publication Data

US 2019/0043354 A1    Feb. 7, 2019

(51) Int. Cl.
  *G08G 1/127* (2006.01)
  *G08G 1/00* (2006.01)
  *H04L 29/08* (2006.01)
  *G08G 1/01* (2006.01)
  *G06Q 30/02* (2012.01)

(52) U.S. Cl.
  CPC ............. *G08G 1/127* (2013.01); *G08G 1/207* (2013.01); *H04L 67/12* (2013.01); *G06Q 30/02* (2013.01); *G08G 1/0112* (2013.01)

(58) Field of Classification Search
  CPC ..................................................... G08G 1/127
  See application file for complete search history.

(56) References Cited

U.S. PATENT DOCUMENTS

| 7,844,718 B2 * | 11/2010 | Polcha | G06F 9/44505 709/227 |
| 8,428,362 B2 * | 4/2013 | Miyajima | G01C 21/3602 382/190 |
| 9,103,671 B1 * | 8/2015 | Breed | G01C 11/025 |

(Continued)

FOREIGN PATENT DOCUMENTS

| WO | 2018041601 | 3/2018 | |
| WO | WO-2019090438 A1 * | 5/2019 | ......... G06F 21/6245 |

OTHER PUBLICATIONS

"International Application Serial No. PCT US2019 037028, International Search Report dated Oct. 4, 2019", 4 pgs.

(Continued)

*Primary Examiner* — Nicholas K Wiltey
*Assistant Examiner* — Tiffany K Luu
(74) *Attorney, Agent, or Firm* — Schwegman Lundberg & Woessner, P.A.

(57) ABSTRACT

A real-time vehicle-based data gathering system includes: a vehicle management server to transmit a request to a plurality of vehicles, the request including geolocation information and microcode, wherein a respective vehicle of the plurality of vehicles is configured to execute the microcode when in a location corresponding to the geolocation information, the microcode to cause the respective vehicle to: execute a data gathering task using sensors in the respective vehicle, and transmit a response to the vehicle management server when the data gathering task is complete; and a data stream processor to receive responses from the plurality of vehicles, the responses including real-time sensed data acquired from the plurality of vehicles.

20 Claims, 5 Drawing Sheets

(56) References Cited

U.S. PATENT DOCUMENTS

| | | | |
|---|---|---|---|
| 2002/0188522 A1* | 12/2002 | McCall | G06Q 30/0613 |
| | | | 705/26.41 |
| 2008/0034200 A1 | 2/2008 | Polcha et al. | |
| 2016/0005229 A1* | 1/2016 | Lee | G06F 3/0488 |
| | | | 345/419 |
| 2016/0214533 A1* | 7/2016 | Doyle | H04N 7/181 |
| 2016/0232794 A1 | 8/2016 | Hafeez et al. | |
| 2017/0032402 A1 | 2/2017 | Patsiokas et al. | |
| 2018/0136005 A1* | 5/2018 | Forutanpour | G01C 21/343 |
| 2018/0259960 A1* | 9/2018 | Cuban | H04N 7/181 |
| 2019/0080180 A1* | 3/2019 | Lyon | G06K 9/00791 |

OTHER PUBLICATIONS

"International Application Serial No. PCT US2019 037028, Written Opinion dated Oct. 4, 2019", 5 pgs.

\* cited by examiner

REAL-TIME VEHICLE-BASED DATA GATHERING

TECHNICAL FIELD

Embodiments described herein generally relate to data gathering and aggregation systems, and in particular, to a real-time vehicle-based data gathering system.

BACKGROUND

Vehicles are increasingly computerized and equipped with sensors and other electronics. Many include short and long-range communication abilities to access satellite radio, Internet services, cellular telephony, and infrastructure communication. Vehicles may also include on-board sensors and systems for advanced driver assistance systems (ADAS). ADAS are those developed to automate, adapt, or enhance vehicle systems to increase safety and provide better driving. In such systems, safety features are designed to avoid collisions and accidents by offering technologies that alert the driver to potential problems, or to avoid collisions by implementing safeguards and taking over control of the vehicle.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Vehicles are equipped with a plethora of sensors to detect conditions both inside and outside of the vehicle. Many vehicles include support for long range communication, such as cellular-based Internet services, or the like. In combination, the vehicles are able to act as mobile sensor that may upload sensed data from a wide variety of locations.

Advertisers, family members, governments, police forces, and other people and entities may be interested in the types of data sourced by sensor-equipped vehicles. What is needed is an infrastructure and related systems to capture data, manage permissions to such data, and share data to data consumers.

The present disclosure provides an architecture and related systems to publish software applications (e.g., widgets, applets, etc.) designed to install in a vehicle for a temporary period and collect data for a specific purpose, manage the collected data, and provide results to data consumers. The service may be monetized by collaborating with system integrators, vehicle original equipment manufacturers (OEM), retail vendors, retail consumers, or the like.

Figure 1:
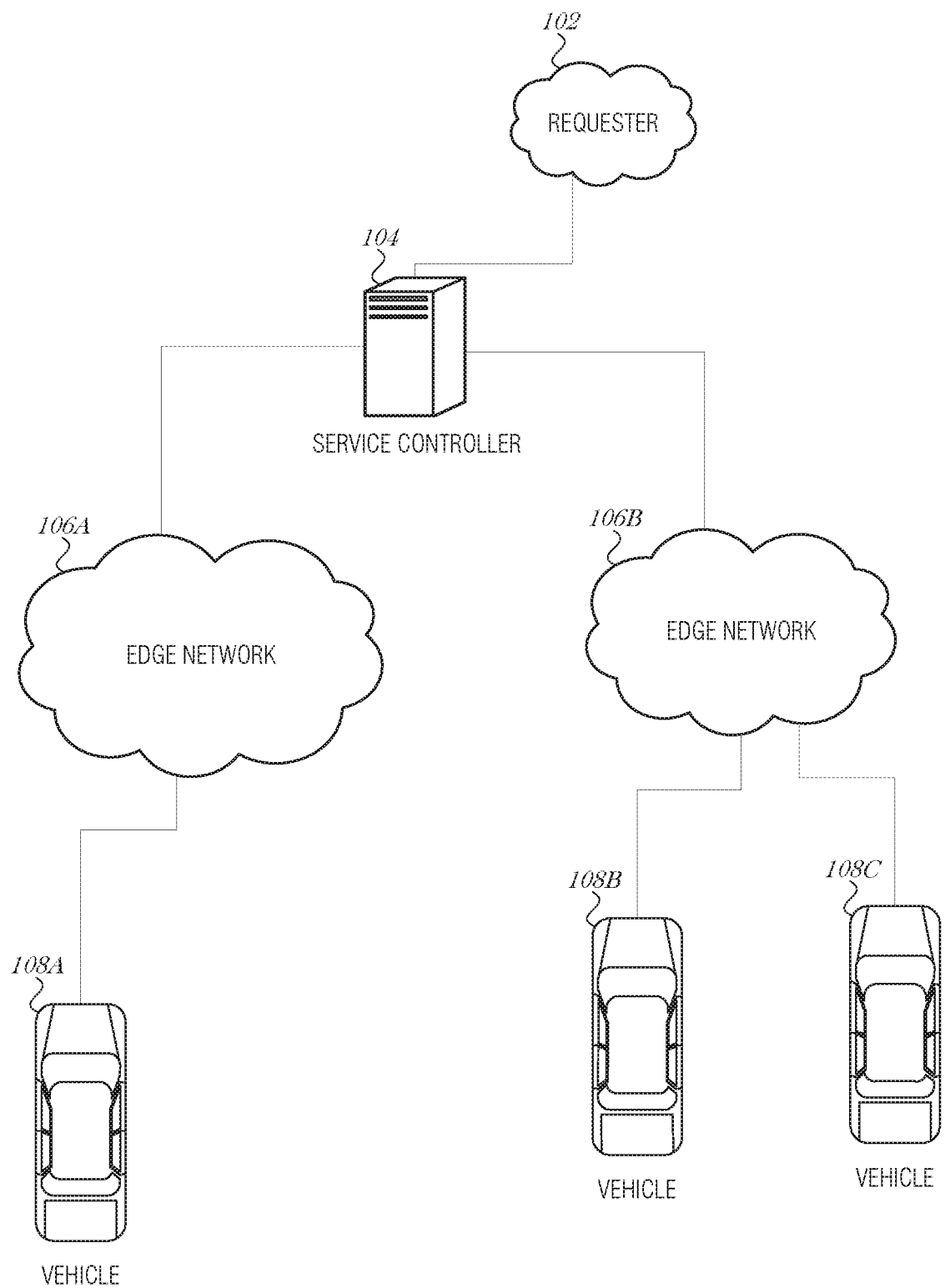
FIG. 1 is a schematic drawing illustrating a system, according to an embodiment.

FIG. 1 is a schematic drawing illustrating a system 100, according to an embodiment. The system 100X) includes a requester 102, a service controller 104, edge networks 106A and 106B (collectively referred to as 106), and vehicles 108A, 108B, and 108C (collectively referred to as 108). While only one requester 102 is shown, it is understood that more requesters may access the service controller 104 to submit a request. Additionally, while only one service controller 104 is shown, it is understood that more than the one service controller 104 may be used in a large-scale implementation. Similarly, there may be a large number of edge networks 106 and vehicles 108 involved in the system 100.

The requester 102 may be an individual person, a corporation, a government agency, or the like. The requester 102 may access the service controller 104 to submit one or more requests for information. The request for information may be include pertinent data, such as a location of the data of interest, a type of data, a time range of data of interest, or the like. Example data request may be "a number of people standing at the intersection of 4th street and 9th avenue in Anytown, USA at 9:00 AM." Another example data request may be "a number of people on Main Street that are wearing jackets."

The service controller 104 may include one or more compute systems, which may be configured as a local or distributed system. The service controller 104 may provide an interface to the requester 102, such as a web application or other means. The service controller 104 may be provided by a vehicle manufacturer, a private corporation, a governmental agency, or the like.

The service controller 104 receives the request from the requester 102 and identifies one or more edge networks 106 that are relevant to the request. The edge networks 106 are geographically distributed to reduce network latency between the edge network 106 and the vehicles 108 in communication with the edge network 106. For instance, edge network 106A may be located in Arizona. U.S.A., and edge network 106B may be located in Haifa, Israel. Depending on the capacity, load, compute power, and other factors, an edge network 106 may be used for a smaller geographic region (e.g., a city) or a larger geographic region (e.g., multiple states in the U.S.A.).

Requests issued by the requester 102 may be geographically bound. For instance, if the requester 102 is interested in the number of sedans on the streets in lower Manhattan, N.Y., then an edge network 106 that includes vehicles 108 that operate in New York is used. An edge network 106 located in Arizona and used to manage data from vehicles in Arizona is not relevant for this particular request.

The edge network 106 receives a request from the service controller 104. The edge network 106 may evaluate the request to determine whether to act on it due to various policies implemented at the edge network 106. If the edge network 106 does not act on the request, a message is transmitted back to the service controller 104 indicating that the request was denied.

If the edge network 106 moves forward and processes the request, then a vehicle management system is used to identify one or more vehicles 108 that are in a location relevant to the request. Data is gathered from the relevant vehicles 108 and processed. The data may be aggregated, filtered, averaged, or otherwise processed to satisfy the request, adhere to privacy policies, store for later use, or the like. Data may be sanitized, anonymized, averaged, or otherwise processed to provide security and privacy.

To gather data from a vehicle 108, the edge network 106 may transmit microcode to the vehicle 108. The microcode may be configured to obtain data relevant to the request. The vehicle 108 may not be aware of the microcode, the execution of the microcode, the request, or other aspects of the edge network's interaction with the vehicle 108. After gathering the data, the microcode may be deleted from the vehicle 108. Intermediate data gathered, processed, stored, or otherwise used by the microcode may also be deleted from the vehicle 108. The microcode or intermediate data may be deleted using a secure delete to ensure that the data is non-recoverable. The deletion protocol is used to ensure data integrity, reduce resource use at the vehicle 108, and protect the privacy of people that were observed by the vehicle's sensors.

In an embodiment, the microcode sent to the vehicle 108 is a computer vision (CV) process, which may be used to classify image data. For instance, a CV process may be used to determine whether people are wearing shorts or pants. For instance, the requester 102 may be curious whether fashion trends in the target location have turned over to shorts in the early spring season. The CV process may be one of many that are housed at the edge network 106 and may be used for multiple tasks. By providing the CV process to the vehicle 108, the vehicle 108 is unburdened and does not have to maintain a library of CV processes. This applies generally to other microcode. Additionally, the microcode may be customized for a particular request, which would be useless for the vehicle 108 to maintain in the long term.

Figure 2:
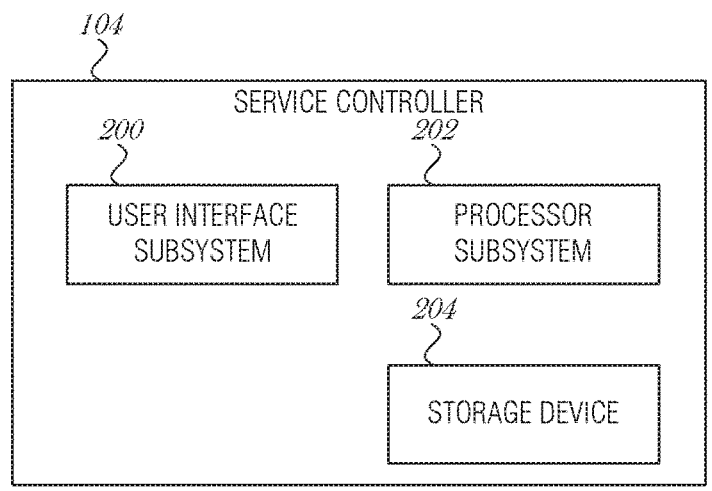
FIG. 2 is a schematic diagram illustrating a service controller, according to an embodiment.

FIG. 2 is a schematic diagram illustrating a service controller 104, according to an embodiment. The service controller 104 includes a user interface subsystem 200, a processor subsystem 202, and a storage device 204. The user interface subsystem 200 may be used by a requester (e.g., requester 102 of FIG. 1) to submit a request to the service controller 104. The user interface subsystem 200 may include a web server to provide a web-based interface, for instance. The user interface subsystem 200 may include an application programming interface (API) to receive a file, a remote procedure call, an Internet address, or other parameterized data to allow the service controller 104 to receive or access one or more requests from a requester. The requests may be provided in a tabulated file, such as a spreadsheet, comma-separated values (CSV) file, or the like, for the service controller 104 to batch process requests. For example, a requester may publish a file to a file transfer protocol (FTP) server and provide the network address to the file to the service controller 104. Alternatively, the requester may upload the file to the service controller 104 via the API. Other implementations are considered to be within the scope of this disclosure.

The processor subsystem 202 may include one or more processors, each with one or more cores. Additionally, the processor subsystem 202 may be disposed on one or more physical devices. The processor subsystem 202 may include one or more specialized processors, such as a graphics processing unit (GPU), a digital signal processor (DSP), a field programmable gate array (FPGA), or a fixed function processor.

The storage device 204 includes one or more devices used to store data. A storage device 204 may include any non-transitory mechanism for storing information in a form readable by a machine (e.g., a computer). For example, a storage device 204 may include read-only memory (ROM), random-access memory (RAM), magnetic disk storage media, optical storage media, flash-memory devices, or other storage devices and media. The storage device 204 is used to store the requests and other related data.

A request includes a geographical location for the request and an action. The geographical location may be a specific address, street crossing, named area (e.g., Central Park), a bounded area defined with geolocation coordinates, or the like.

The action may be selected from various actions that are provided by the service controller 104. For instance, the service controller 104 may support certain actions and provide selectable components of the actions in a user interface on a web page for a user to select. Actions may be deconstructed into the components of: an activity, a timeframe, and filter criteria.

The activity in an action may be further categorized by the service controller 104 or other entity into selectable options, such as "count total" or "count average," for example. Other options may be provided based on the capabilities of the service controller 104.

The timeframe may be provided as a specific time (e.g., Monday, May 21, 2018 at 7:00 AM Central Standard Time), a time period (e.g., Monday, May 21, 2018 from 7:00 AM Central Standard Time to 9:00 AM Central Standard Time), a recurring time period (e.g., every Monday from 3:00-4:00 PM), or the like.

The filter criteria may be used to filter data. The filtered data may be used by the service controller 104 to provide specific information to the requester 102. Example filter criteria may be "blue sedans" or "office buildings."

Combining the components of an action may provide a query for the service controller 104 to provide to an edge network 106. An example action is "count total number of women wearing dresses during the period 3:00-4:00 PM on Friday, Oct. 12, 2018." Using the location information provided in the request, the service controller 104 determines and routes the request to an appropriate edge network 106. Edge networks and their corresponding geographical coverage are stored in the storage device 204, and the service controller 104 is able to determine whether a request may be satisfied. If the request falls within a covered geographical location, then the request (or a form of it) may be transmitted to the edge network 106. A confirmation message may be provided to the requester 102 indicating that the request was submitted to the edge network 106.

After the request is processed by the edge network 106, the results are received at the service controller 104. The service controller 104 then may further process the results, or may forward the results with little or no processing.

The service controller 104 may also control monetization aspects of the system. The service controller 104 may be provided by a vehicle OEM, or may work with a vehicle OEM. The vehicle OEM may maintain geolocations of vehicles that it produces. Manufactures often include various concierge, emergency response, navigation, or other location-based services in electronic systems in vehicles. When a vehicle is operated, the vehicle may provide location information to the manufacturer or an associated company, to provide services to the vehicle operator. The geolocation information is useful to the service controller 104 to provide a focused data gathering effort. As such, the vehicle manufacturer and the provider of the service controller 104 may enter into an agreement where the manufacturer provides vehicle location data in return for compensation. Multiple vehicle manufacturers may have vehicles available for data gathering in a given location. In order to compensate the correct company, the service controller 104 may obtain vehicle identifiers or other identifying information from the vehicles so that the proper manufacturer is compensated. Part of a fee that is charged to the requester may be used to compensate the manufacturers.

Figure 3:
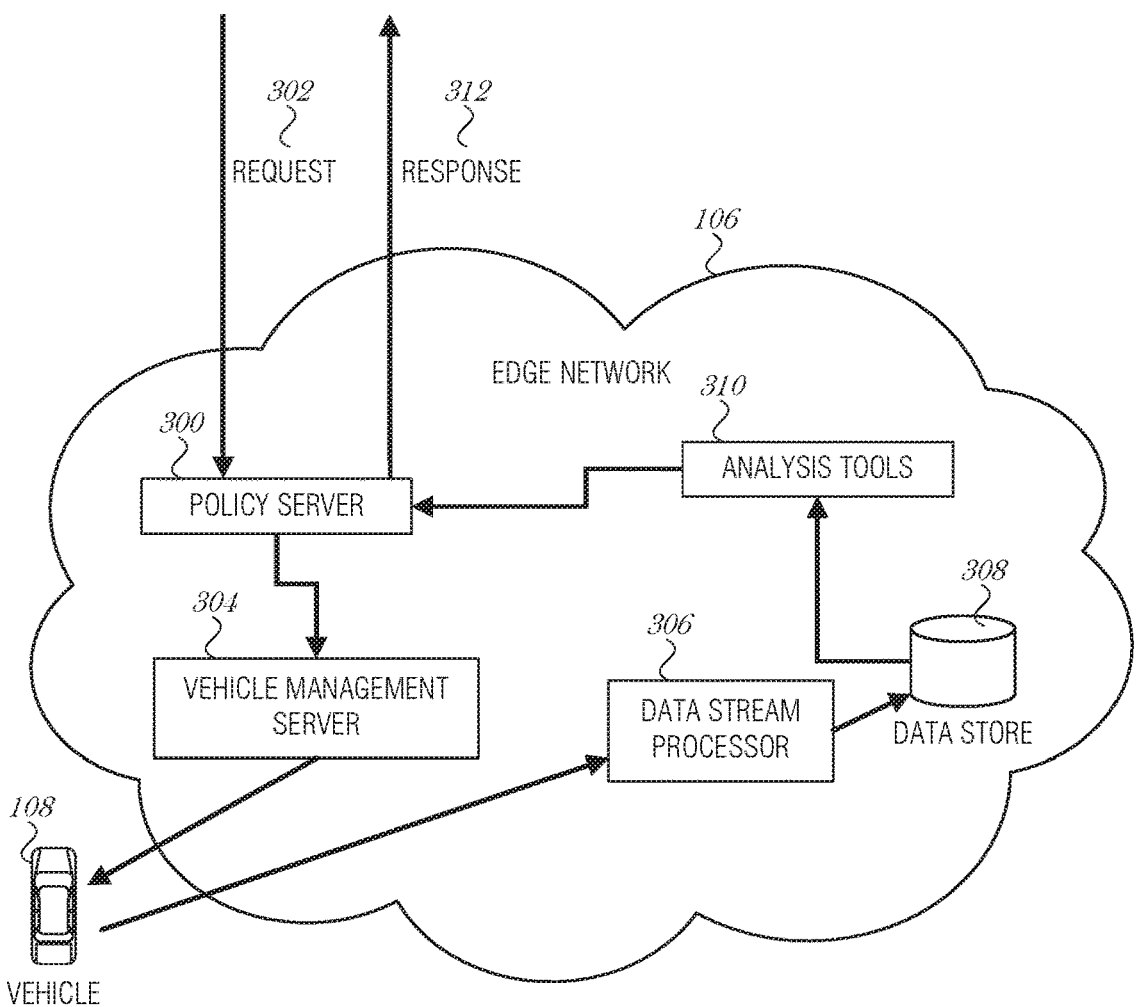
FIG. 3 is a schematic diagram illustrating an edge network, according to an embodiment.

FIG. 3 is a schematic diagram illustrating an edge network 106, according to an embodiment. A policy server 300 receives a request 302 from service controller 104. The policy server 300 acts as a gateway and filters requests from the service controller 104. If a request is one that may compromise personal privacy, is for an illicit purpose, or otherwise illegal, the policy server 300 may reject the request and inform the service controller 104. The policy server 300 may rely on one or more policies that are set by a regional administrator. For instance, each edge network 106 may have different policies based on local, national, or other rules or laws that protect personal privacy. As such, a request sent to one location may be admissible, while the same request sent to another location may be prohibited under some set policy.

The policy server 300 interfaces with a vehicle management server 304 to identify vehicles 108 that are located near the location of interest, as provided in the request. The vehicle management server 304 transmits microcode to the vehicles 108 in the area of interest. The microcode may be specially configured to gather information related to the request. For instance, if the request it to count the number of people at an intersection, the microcode may include a computer vision (CV) algorithm that is able to identify people in images. As another example, if the request is to determine if houses in the area need have roof damage, the microcode may include image analysis software to identify roof defects and characterize their severity.

After the data is collected and analyzed at the vehicle 108, the vehicle 108 transmits a response to the edge network 106, which is received at a data stream processor 306. The vehicle 108 may process the data before transmitting the response. Alternatively, the vehicle 108 may transmit raw data, which may be further processed at the edge network 106. After the vehicle 108 is finished with the data collection task, the microcode and other information (e.g., gathered data or intermediate processed data) is deleted.

The data stream processor 306 is configured to receive data from a number of vehicles 108. In an embodiment, the data stream processor 306 is implemented using an ingestion server (e.g., Apache Kafka®) and a streaming server (e.g., Apache Spark™). In general, the data stream processor 306 is used to receive live input data streams and process the streams. The processing may be batched. The information from the data stream may be stored in a data store 308. The data store 308 may be implemented with a data warehouse architecture, such as Apache Hive™ on an HDFS (Hadoop® Distributed File System) or Apache Cassandra®.

The data stream processor 306 may store data in the data store 308 for later use. For instance, if requests operate on the same or similar data, the data may be reused instead of gathered real-time from the vehicles 108.

Analysis tools 310 may access the data store 308 and operate on data stored therein. The analysis tools 310 may refer to the request and process the data according to a specific type of output. For instance, if the request was to determine an average number of people walking near a storefront over a period of time, the analysis tools 310 may obtain data from the data store 308 and calculate the result.

The analysis tools 310 pass the result to the policy server 300, which then forwards the result to the service controller 104 as a response 312. The result 312 may be anonymized in a way to protect the identities of people represented by the data. The policy server 300 may perform data anonymization or scrubbing. The policy server 300 may include regional policy settings, which may be provided by a local administrator or may be provided from the service controller 104. Policy settings are used to control data filtering, anonymization, masking, or other techniques used to scrub and clean data. Image data may be masked with blackened regions to hide faces, license plates, addresses, or other personal identification information. A blur filter may be used as well. Other data manipulations may be used to hide data, obscure it, or render it unintelligible.

Such filtering, scrubbing, or other data manipulation may be performed by terminal devices (e.g., a vehicle 108), a component of the edge network 106, or at other places, to ensure an appropriate level of data management. For instance, an edge network 106 located in Germany may be required to filter out personally identifiable information of people, vehicles, buildings, or other objects captured in video or images. Such controls may not be required in another European country, such as Italy. Edge networks 106 operating in Italy may use a different set of privacy policies to obscure data obtained in vehicles operating in this region.

The policy server 300, vehicle management server 304, data stream processor 306, and analysis tools 310 may be virtualized. Each element 300, 304, 306, 310 may be distributed across several physical machines, arranged to suit a particular embodiment needed for proper performance.

A fog network may be considered to be a massively interconnected network wherein a number of IoT devices are in communications with each other, for example, by radio links. The fog network may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

In various example implementations, the operations and functionality described above with reference to FIGS. 1-6 may be implemented in a fog, cloud, or other IoT network. In such an arrangement, a set or sequence of instructions may be executed to cause the service controller 104, edge network 106, policy server 300, vehicle management server 304, vehicle 108, or other components described to perform any one of the methodologies discussed herein. Operable machines in the network include an IoT gateway, an edge device, a personal computer (PC), a tablet PC, a personal digital assistant (PDA), a mobile telephone or smartphone, or any machine capable of executing instructions (sequential or otherwise) that specify actions to be taken by that machine. Moreover, the operations and functionality described herein may apply to a variety of network settings, including IoT networking, edge networking, fog networking, cloud networking, and all hybrids thereof.

Figure 4:
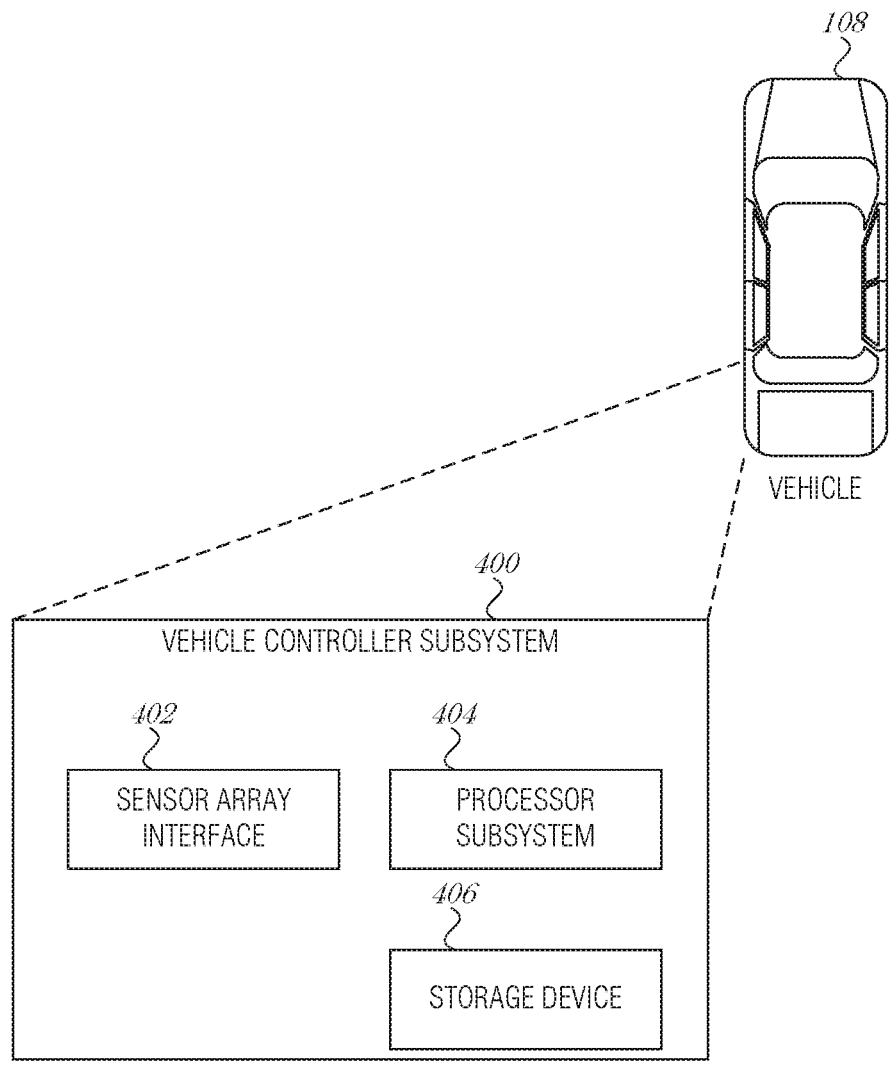
FIG. 4 is a schematic drawing illustrating a vehicle, according to an embodiment.

FIG. 4 is a schematic drawing illustrating a vehicle 108, according to an embodiment. FIG. 4 includes a vehicle controller subsystem 400 incorporated into the vehicle 108. The vehicle 108 may be of any type of vehicle, such as a commercial vehicle, a consumer vehicle, a recreation vehicle, a car, a truck, a motorcycle, airplane, or a boat. The vehicle 108 includes a sensor array, which may include various forward, side, and rearward facing cameras, radar, LIDAR, ultrasonic, or similar sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle. Cameras in the sensor array may include infrared or visible light cameras, able to focus at long-range or short-range with narrow or large fields of view.

The vehicle 108 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

In addition, the vehicle 108 may include an on-board diagnostics system to record vehicle operation and other aspects of the vehicle's performance, maintenance, or status. The on-board diagnostics system may determine various vehicle state data, such as whether the windshield wipers are activated, whether the driving lights are activated, whether a sunroof is open or closed, etc.

Components of the vehicle controller subsystem 400 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

In operation, the vehicle controller subsystem 400 may receive a request from a network-based service, such as edge network 106. The request may include one or more actions for the vehicle 108 to perform. The actions may include data gathering types of activities, based on sensor data obtained from various sensors installed in or around the vehicle 108. Requests may be constrained to a certain geographic area. The geographic area may be defined with a geofence. A geofence is a geographic area defined with global positioning coordinates, such as latitude and longitude. Using a global positioning system (GPS) receiver, the vehicle 104 may determine whether it is inside or outside of a geofenced area.

The vehicle controller subsystem 400 includes a sensor array interface 402, a processor subsystem 404, and a storage device 406. The processor subsystem 404 may include one or more processors, each with one or more cores. Additionally, the processor subsystem 404 may be disposed on one or more physical devices. The processor subsystem 404 may include one or more specialized processors, such as a graphics processing unit (GPU), a digital signal processor (DSP), a field programmable gate array (FPGA), or a fixed function processor.

The storage device 406 includes one or more devices used to store data. A storage device 406 may include any non-transitory mechanism for storing information in a form readable by a machine (e.g., a computer). For example, a storage device 406 may include read-only memory (ROM), random-access memory (RAM), magnetic disk storage media, optical storage media, flash-memory devices, or other storage devices and media. The storage device 406 may be used to store the requests from the edge network 106, microcode, sensed data, and other related data.

The vehicle controller subsystem 400 may receive a request from an edge network 106, which includes location information and microcode. The vehicle controller subsystem 400X) may validate the microcode and install it to execute. Depending on the type of microcode, the microcode may execute on a platform hosted at the vehicle controller subsystem 400. For instance, the microcode may be a bytecode file that is executable on a virtual machine running on the vehicle controller subsystem 400. Microcode may be a script, bytecode, a compiled executable application, or other machine-readable instructions that cause the vehicle controller subsystem 400 to operate in accordance with the request from the edge network 106.

The vehicle controller subsystem 400 may execute the microcode, which may operate one or more sensors via the sensor array interface 402 to collect data. The data is then operated on by the microcode. Once the microcode has finished collecting and processing data, it may immediately upload the results to the edge network 106 or temporarily batch the data in memory to send as a group. When the vehicle controller subsystem 400 detects that the window of the request has ended, either in time or space, it will delete the microcode.

The vehicle controller subsystem 400 may be installed as an after-market component of the vehicle 108, or may be provided as a manufacturer option. As an after-market component, the vehicle controller subsystem 400 may plug into the existing infrastructure in the vehicle 108 to obtain sensor data and may provide the warning lights. Alternatively, the vehicle controller subsystem 400 may incorporate its own sensor array.

Figure 5:
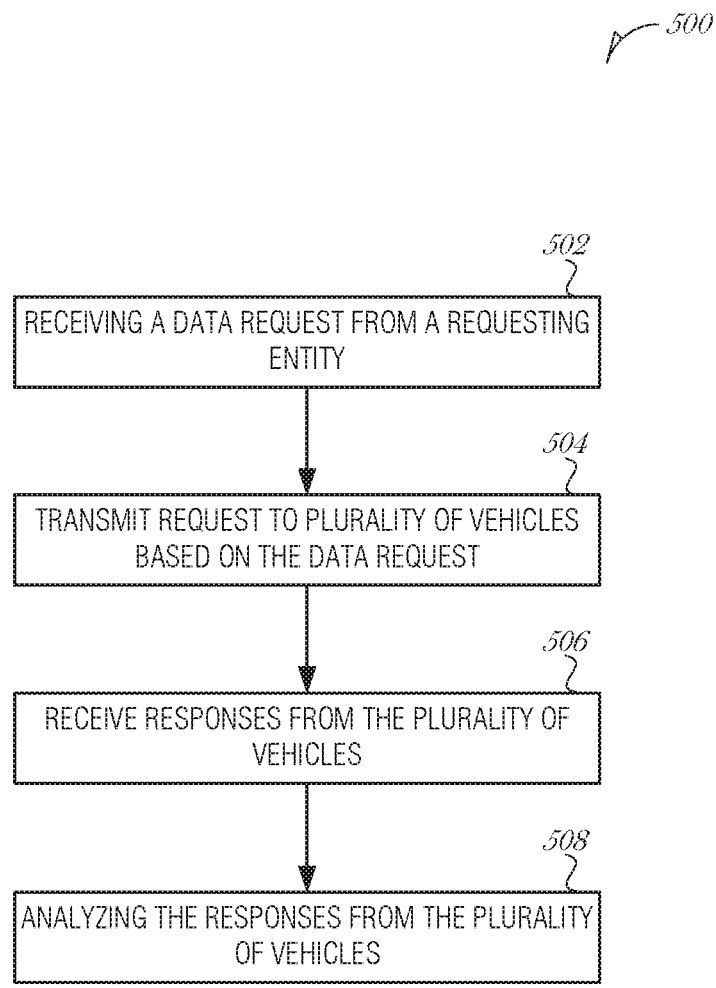
FIG. 5 is a flowchart illustrating a method for real-time vehicle-based data gathering, according to an embodiment.

FIG. 5 is a flowchart illustrating a method 500 for real-time vehicle-based data gathering, according to an embodiment. At 504, a request is transmitted to a plurality of vehicles from an electronic system, the request including geolocation information and microcode. The electronic system may be an edge network (e.g., edge network 106) or component of an edge network (e.g., vehicle management server 304), in various embodiments. The microcode may be a script, bytecode, a compiled executable application, or other machine-readable instructions that cause a respective vehicle of the plurality of vehicles to operate in accordance with the request.

The request is received by a respective vehicle of the plurality of vehicles, which is configured to execute the microcode when in a location corresponding to the geolocation information. The microcode causes the respective vehicle to: execute a data gathering task using sensors in the respective vehicle, and transmit a response to the vehicle management server when the data gathering task is complete. In an embodiment, the microcode includes a computer vision algorithm to be executed at the plurality of vehicles. In another embodiment, the microcode is configured to delete itself when completed with its data gathering task.

At 506, the responses from the plurality of vehicles are received at the electronic system. The responses include real-time sensed data acquired from the plurality of vehicles. The data may be processed by the microcode that was loaded onto the vehicles.

The method 500 may include the optional operation 508 of analyzing the real-time sensed data and produce an output. This analysis may include various statistical, counting, or other functions based on a number of elements identified in the data.

The method 500 may include the optional operation 502 of receiving a data request from a requesting entity, the data request used to create the request to the plurality of vehicles. The requesting entity may be a service controller (e.g., service controller 104), or other person or system. In an embodiment, the data request includes a location criteria, a timeframe criteria, and a filter criteria. These criteria are used to identify relevant vehicles based on location and time, and filter data to produce a desired output. In an embodiment, the data request may be analyzed to determine whether to permit the data request to be processed at the electronic system.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 6:
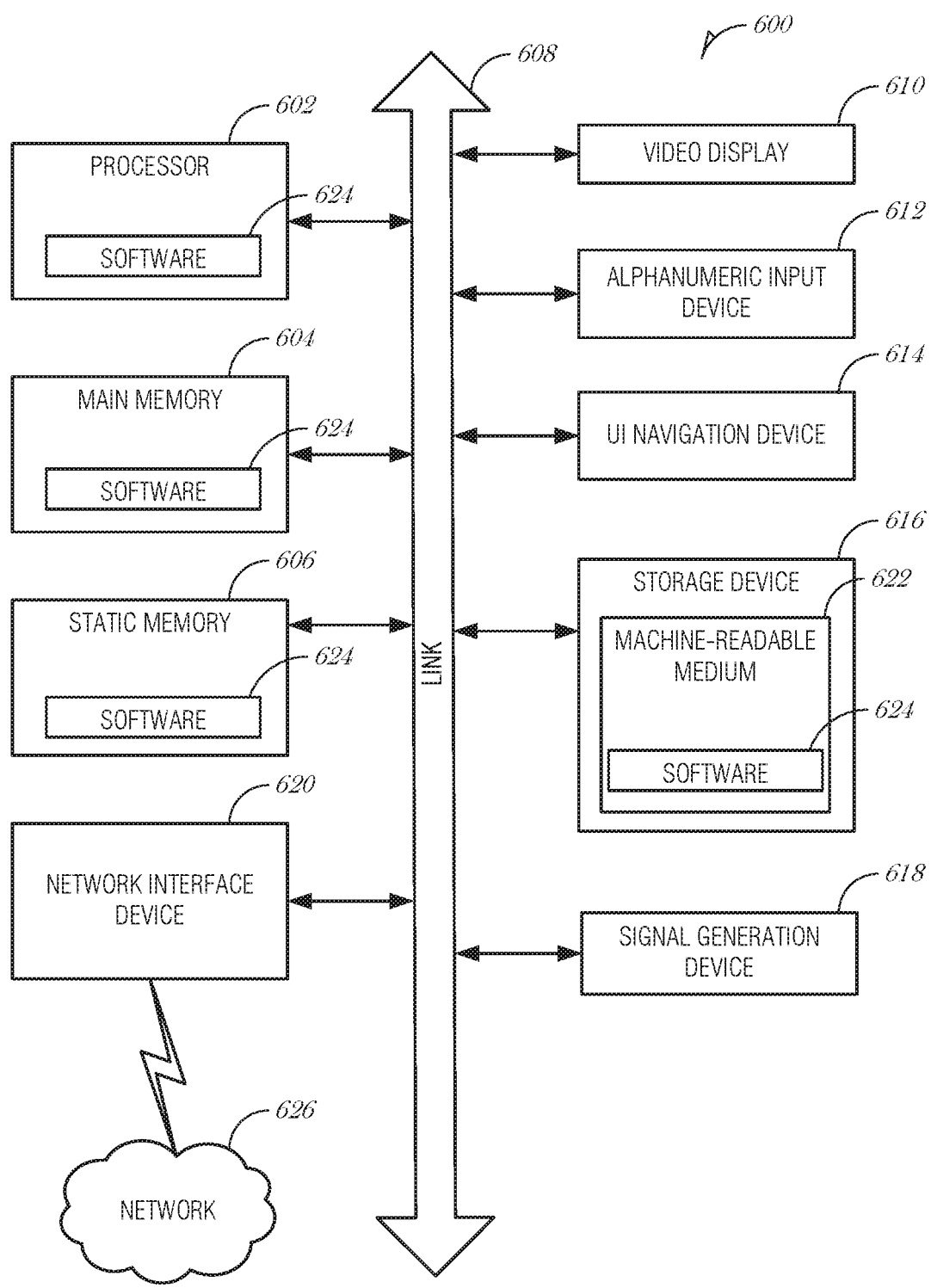
FIG. 6 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for real-time vehicle-based data gathering, the system comprising: a vehicle management server to transmit a request to a plurality of vehicles, the request including geolocation information and microcode, wherein a respective vehicle of the plurality of vehicles is configured to execute the microcode when in a location corresponding to the geolocation information, the microcode to cause the respective vehicle to: execute a data gathering task using sensors in the respective vehicle, and transmit a response to the vehicle management server when the data gathering task is complete; and a data stream processor to receive responses from the plurality of vehicles, the responses including real-time sensed data acquired from the plurality of vehicles.

In Example 2, the subject matter of Example 1 includes, analysis tools to analyze the real-time sensed data and produce an output.

In Example 3, the subject matter of Examples 1-2 includes, a policy server to receive a data request from a requesting entity, the data request used to create the request to the plurality of vehicles.

In Example 4, the subject matter of Example 3 includes, wherein the data request includes a location criteria, a timeframe criteria, and a filter criteria.

In Example 5, the subject matter of Examples 3-4 includes, wherein the policy server is to analyze the data request and determine whether to permit the data request to be processed at the system.

In Example 6, the subject matter of Examples 1-5 includes, wherein the microcode includes a computer vision algorithm to be executed at the plurality of vehicles.

In Example 7, the subject matter of Examples 1-6 includes, wherein the microcode is configured to delete itself when completed with its data gathering task.

Example 8 is a method for real-time vehicle-based data gathering, the method comprising: transmitting, from an electronic system, a request to a plurality of vehicles, the request including geolocation information and microcode, wherein a respective vehicle of the plurality of vehicles is configured to execute the microcode when in a location corresponding to the geolocation information, the microcode to cause the respective vehicle to: execute a data gathering task using sensors in the respective vehicle, and transmit a response to the vehicle management server when the data gathering task is complete; and receiving responses from the plurality of vehicles at the electronic system, the responses including real-time sensed data acquired from the plurality of vehicles.

In Example 9, the subject matter of Example 8 includes, analyzing the real-time sensed data and produce an output.

In Example 10, the subject matter of Examples 8-9 includes, receiving a data request from a requesting entity, the data request used to create the request to the plurality of vehicles.

In Example 11, the subject matter of Example 10 includes, wherein the data request includes a location criteria, a timeframe criteria, and a filter criteria.

In Example 12, the subject matter of Examples 10-11 includes, analyzing the data request and determining whether to permit the data request to be processed at the electronic system.

In Example 13, the subject matter of Examples 8-12 includes, wherein the microcode includes a computer vision algorithm to be executed at the plurality of vehicles.

In Example 14, the subject matter of Examples 8-13 includes, wherein the microcode is configured to delete itself when completed with its data gathering task.

Example 15 is at least one machine-readable medium including instructions, which when executed by a machine, cause the machine to perform operations of any of the methods of Examples 8-14.

Example 16 is an apparatus comprising means for performing any of the methods of Examples 8-14.

Example 17 is at least one non-transitory machine-readable medium including instructions for real-time vehicle-based data gathering, the instructions when executed by an electronic system, cause the electronic system to perform operations comprising: transmitting a request to a plurality of vehicles, the request including geolocation information and microcode, wherein a respective vehicle of the plurality of vehicles is configured to execute the microcode when in a location corresponding to the geolocation information, the microcode to cause the respective vehicle to: execute a data gathering task using sensors in the respective vehicle, and transmit a response to the vehicle management server when the data gathering task is complete; and receiving responses from the plurality of vehicles, the responses including real-time sensed data acquired from the plurality of vehicles.

In Example 18, the subject matter of Example 17 includes, analyzing the real-time sensed data and produce an output.

In Example 19, the subject matter of Examples 17-18 includes, receiving a data request from a requesting entity, the data request used to create the request to the plurality of vehicles.

In Example 20, the subject matter of Example 19 includes, wherein the data request includes a location criteria, a timeframe criteria, and a filter criteria.

In Example 21, the subject matter of Examples 19-20 includes, analyzing the data request and determining whether to permit the data request to be processed at the electronic system.

In Example 22, the subject matter of Examples 17-21 includes, wherein the microcode includes a computer vision algorithm to be executed at the plurality of vehicles.

In Example 23, the subject matter of Examples 17-22 includes, wherein the microcode is configured to delete itself when completed with its data gathering task.

Example 24 is an apparatus for real-time vehicle-based data gathering comprising: means for transmitting a request to a plurality of vehicles, the request including geolocation information and microcode, wherein a respective vehicle of the plurality of vehicles is configured to execute the microcode when in a location corresponding to the geolocation information, the microcode to cause the respective vehicle to: execute a data gathering task using sensors in the respective vehicle, and transmit a response to the vehicle management server when the data gathering task is complete; and means for receiving responses from the plurality of vehicles, the responses including real-time sensed data acquired from the plurality of vehicles.

In Example 25, the subject matter of Example 24 includes, means for analyzing the real-time sensed data and produce an output.

In Example 26, the subject matter of Examples 24-25 includes, means for receiving a data request from a requesting entity, the data request used to create the request to the plurality of vehicles.

In Example 27, the subject matter of Example 26 includes, wherein the data request includes a location criteria, a timeframe criteria, and a filter criteria.

In Example 28, the subject matter of Examples 26-27 includes, means for analyzing the data request and determining whether to permit the data request to be processed at the electronic system.

In Example 29, the subject matter of Examples 24-28 includes, wherein the microcode includes a computer vision algorithm to be executed at the plurality of vehicles.

In Example 30, the subject matter of Examples 24-29 includes, wherein the microcode is configured to delete itself when completed with its data gathering task.

Example 31 is at least one machine-readable medium including instructions that, when executed by a processor subsystem, cause the processor subsystem to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first." "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for real-time vehicle-based data gathering, the system comprising:
   a vehicle management server to transmit a request to a plurality of vehicles, the request including geolocation information, a time period, filter criteria, and executable code, wherein the executable code includes a computer vision algorithm to process images,
   wherein the plurality of vehicles are configured to execute the executable code when in a location corresponding to the geolocation information, the executable code to cause the plurality of vehicles to:
      capture a plurality of images using sensors in the plurality of vehicles during the time period in the request,
      analyze the plurality of images using the computer vision algorithm and the filter criteria, the computer vision algorithm specifically corresponding to the filter criteria,
      calculate an intermediate result based on the analysis of the plurality of images,
      transmit a response to the vehicle management server, the response including the intermediate result, and
      delete the plurality of images and the intermediate result after transmitting the response; and
   a data stream processor to:
      receive responses from at least one of the plurality of vehicles, the responses including information regarding real-time sensed data acquired from at least one of the plurality of vehicles, and
      process the intermediate results contained in the responses to calculate a transmission result.

2. The system of claim 1, further comprising a policy server to receive a data request from a requesting entity, the data request used to create the request to the plurality of vehicles.

3. The system of claim 2, wherein the policy server is to analyze the data request and determine whether to permit the data request to be processed.

4. The system of claim 1, wherein the executable code is configured to delete itself when completed.

5. The system of claim 1, wherein to process the intermediate results, the data stream processor is to aggregate the intermediate results to calculate the transmission result.

6. The system of claim 1, wherein to process the intermediate results, the data stream processor is to average the intermediate results to calculate the transmission result.

7. The system of claim 1, wherein the intermediate results represent a count of objects that satisfy the filter criteria.

8. The system of claim 1, wherein the geolocation information is a geofenced area.

9. The system of claim 1, wherein the vehicle management server is hosted in an edge network and wherein the request is received from a service controller that communicates with multiple vehicle management servers in respective edge networks.

10. The system of claim 9, wherein the edge network is selected by the service controller based on the geolocation in the request.

11. A method for real-time vehicle-based data gathering, the method comprising:
   transmitting, from an electronic system, a request to a plurality of vehicles, the request including geolocation information and executable code, wherein the executable code includes a computer vision algorithm to process images,
   wherein a respective vehicle of the plurality of vehicles is configured to execute the executable code when in a location corresponding to the geolocation information, the executable code to cause the respective vehicle to: capture a plurality of images using sensors in the plurality of vehicles during the time period in the request, analyze the plurality of images using the computer vision algorithm and the filter criteria, the computer vision algorithm specifically corresponding to the filter criteria, calculate an intermediate result based on the analysis of the plurality of images, and transmit a response to the vehicle management server, the response including the intermediate result;
   receiving responses from the plurality of vehicles at the electronic system, the responses including real-time sensed data acquired from the plurality of vehicles; and
   processing the intermediate results contained in the responses to calculate a transmission result.

12. The method of claim 11, further comprising analyzing the real-time sensed data and producing an output.

13. The method of claim 11, further comprising receiving a data request from a requesting entity, the data request used to create the request to the plurality of vehicles.

14. The method of claim 13, further comprising analyzing the data request and determining whether to permit the data request to be processed at the electronic system.

15. The method of claim 11, wherein the executable code is configured to delete itself when completed.

16. At least one non-transitory machine-readable medium including instructions for real-time vehicle-based data gathering, the instructions when executed by an electronic system, cause the electronic system to perform operations comprising:

transmitting a request to a plurality of vehicles, the request including geolocation information and executable code, wherein the executable code includes a computer vision algorithm to process images, wherein a respective vehicle of the plurality of vehicles is configured to execute the executable code when in a location corresponding to the geolocation information, the executable code to cause the respective vehicle to: capture a plurality of images using sensors in the plurality of vehicles during the time period in the request, analyze the plurality of images using the computer vision algorithm and the filter criteria, the computer vision algorithm specifically corresponding to the filter criteria, calculate an intermediate result based on the analysis of the plurality of images, and transmit a response to the vehicle management server, the response including the intermediate result;

receiving responses from the plurality of vehicles, the responses including real-time sensed data acquired from the plurality of vehicles; and processing the intermediate results contained in the responses to calculate a transmission result.

17. The at least one non-transitory machine-readable medium of claim 16, further comprising analyzing the real-time sensed data and producing an output.

18. The at least one non-transitory machine-readable medium of claim 16, further comprising receiving a data request from a requesting entity, the data request used to create the request, to the plurality of vehicles.

19. The at least one non-transitory machine-readable medium of claim 18, further comprising analyzing the data request and determining whether to permit the data request to be processed at the electronic system.

20. The at least one non-transitory machine-readable medium of claim 16, wherein the executable code is configured to delete itself when completed.

* * * * *

UNITED STATES PATENT AND TRADEMARK OFFICE
CERTIFICATE OF CORRECTION

PATENT NO. : 11,094,193 B2
APPLICATION NO. : 16/022204
DATED : August 17, 2021
INVENTOR(S) : Oluwafemi et al.

It is certified that error appears in the above-identified patent and that said Letters Patent is hereby corrected as shown below:

In the Claims

In Column 18, Line 14, in Claim 18, delete "request," and insert --request-- therefor Signed and Sealed this
Nineteenth Day of October, 2021

Drew Hirshfeld
*Performing the Functions and Duties of the
Under Secretary of Commerce for Intellectual Property and
Director of the United States Patent and Trademark Office*